US011109522B2

(12) United States Patent
Evrard et al.

(10) Patent No.: US 11,109,522 B2
(45) Date of Patent: Sep. 7, 2021

(54) FOLDING HITCH

(71) Applicant: AGCO International GmbH, Neuhausen (CH)

(72) Inventors: Noemie Evrard, Beauvais (FR); Francois Quoniam, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 315 days.

(21) Appl. No.: 16/419,173

(22) Filed: May 22, 2019

(65) Prior Publication Data
US 2019/0357419 A1 Nov. 28, 2019

(30) Foreign Application Priority Data
May 23, 2018 (EP) ..................................... 18290057

(51) Int. Cl.
*A01B 59/06* (2006.01)
*A01B 73/04* (2006.01)
*A01B 63/108* (2006.01)

(52) U.S. Cl.
CPC .......... *A01B 73/048* (2013.01); *A01B 59/064* (2013.01); *A01B 59/067* (2013.01); *A01B 59/062* (2013.01); *A01B 63/108* (2013.01)

(58) Field of Classification Search
CPC ....... A01B 59/02; A01B 59/04; A01B 59/062; A01B 59/064; A01B 59/066; A01B 59/067; A01B 59/068; A01B 63/108; A01B 63/118; A01B 73/048
USPC ....................................................... 172/439
See application file for complete search history.

(56) References Cited

U.S. PATENT DOCUMENTS

| 4,715,770 | A |   | 12/1987 | Kryscyk |   |
|---|---|---|---|---|---|
| 5,542,477 | A |   | 8/1996 | DeFrancq |   |
| 6,062,321 | A | * | 5/2000 | Defrancq | A01B 59/048 |
|   |   |   |   |   | 172/448 |
| 8,496,070 | B2 | * | 7/2013 | Kollath | A01B 73/00 |
|   |   |   |   |   | 172/448 |
| 9,788,471 | B2 | * | 10/2017 | Buttjer | A01B 59/068 |
| 2012/0068438 | A1 |   | 3/2012 | Kollath |   |

FOREIGN PATENT DOCUMENTS

| EP | 1 842 412 A1 |   | 10/2007 |
|---|---|---|---|
| FR | 2 789 846 A1 |   | 8/2000 |
| GB | 2461511 A |   | 1/2010 |
| WO | 02/21898 A1 |   | 3/2002 |
| WO | 2013/087233 | * | 6/2013 |

OTHER PUBLICATIONS

UK Intellectual Property Office, Search Report for related Application No. GB1808524.1, dated Nov. 21, 2018.
European Patent Office, Search Report for related European Application No. EP 19 17 2065, dated Nov. 11, 2019.

* cited by examiner

*Primary Examiner* — Gary S Hartmann

(57) ABSTRACT

A hitch assembly having a carrier for attachment to a working vehicle. A pair of lift arms, link member and actuator are pivotally interconnected such that the hitch assembly is lockable in working and folded configurations. In the working configuration, the lift arms are secured to the carrier and the actuator is operable to raise and lower the lift arms. In the folded configuration, the lift arms are pivotable relative to the carrier. Extension of the actuator folds the lift arms relative to the carrier to move the hitch assembly between the working and folded configuration.

6 Claims, 7 Drawing Sheets

FOLDING HITCH

BACKGROUND OF THE INVENTION

Field of the Invention

The present invention relates to tractor hitch assemblies which facilitate the attachment of implements to a tractor.

Description of Related Art

Implements were traditionally hauled by tractors also known as working vehicles, and attached thereto using either a drawbar or three-point linkage. Today, many large range tractors are fitted with three-point linkages or hitches on both the rear and front to allow two implements to be attached thereby increasing productivity and reducing the number of passes required to work a given area.

Front hitch assemblies inherently protrude forwardly of the main working vehicle frame in order to provide sufficient clearance between implement and working vehicle. Similarly rear hitches protrude rearward from a working vehicle further extending the profile of a working vehicle. When not in use, the lift arms of front hitch assemblies present a hazardous extension of the working vehicle's profile. Furthermore, the extension of the working vehicle's profile adversely affects the approach and or departure angle of the working vehicle.

Attempts have been made to reduce the hazard by providing a transport position or arrangements for the lift arms in which they are stowed closer to the working vehicle frame. However, these can be cumbersome for the operator to change between the transport and operating positions often requiring the detachment and/or lifting of heavy components. Furthermore, the stowed arms often obstruct the working vehicle lights or other components thus presenting an additional hazard especially when on the road.

It is therefore an object of the invention to provide a hitch assembly which can be switched between a transport arrangement and a working arrangement with greater ease and without the need to lift heavy parts whilst maintaining sufficient strength in the structure.

SUMMARY OF THE INVENTION

Accordingly, there is provided 1 a hitch assembly for a working vehicle, the front hitch assembly comprising: a carrier for attachment to a working vehicle, the carrier being pivotable about a first axis; a pair of lift arms each of the lift arms having a first end and a second end, the lift arms pivotably attached to the carrier about a second axis, the second axis being proximate the first ends of the lift arms; a link member having a first end and a second end, the first end of the link member being pivotably attached to the pair of lift arms about a third axis, the third axis being positioned closer to the second end of the lift arms than the second axis, the second end of the link for attachment to a working vehicle; a locking means; an actuator pivotably connected to the carrier and the lift arms at the second axis; wherein the hitch assembly has a working configuration and a folded configuration; and wherein in the working configuration, the locking means secures the lift arms relative to the carrier such that relative movement about the second axis is prevented and the actuator is operable to raise and lower the lift arms; and wherein in the folded configuration, the lift arms are pivotable relative to the carrier about the second axis, and the second end of the link member is secured to a vehicle mount, such that extension of the actuator folds the lift arms relative to the carrier about the second axis, thereby moving the hitch assembly from the working configuration to the folded configuration. Advantageously, when in the stowed configuration or arrangement the hitch assembly requires a smaller package space then when in the working configuration or arrangement. Consequently the hitch assembly protrudes less far from the front of the vehicle enabling operation of the vehicle in smaller environments and the approach angle of the vehicle is increased. Furthermore, utilising the double pivot arrangement allows an operator to utilise the power of the actuators hitch assembly to move the hitch from the working arrangement to the stowed arrangement with minimal effort.

Advantageously the locking means may be a locking pin, the locking pin may be insertable into corresponding holes in the lift arms and carrier such that lift arms are fixed relative to the carrier. By using a pin that is removable from the hitch assembly, the pin may be replaced easily should it become worn and also there is a reduction in complexity over other potential locking means thereby increasing system reliability.

Advantageously, the actuator may be a hydraulic ram. Using hydraulic rams mean that the hitch assembly could be retrofit to existing tractors or working vehicles and function with existing hydraulic supply systems.

The locking means may secure the second end of link member relative to the lift arms when the hitch is in the working configuration.

The locking means may be used to secure the link member to a vehicle mount.

Advantageously, the locking means may be a lock collar, the lock collar may be slideable over the first end of the lift arms and the carrier such that the lift arms are fixed relative to the carrier. Using a locking collar would mean that the locking means is captive on the lift arms or carrier and thus less likely to be misplaced.

BRIEF DESCRIPTION OF THE DRAWINGS

Embodiments of the invention will now be described, by way of example only, with reference to the accompanying drawings, in which.

The drawings are provided by way of reference only, and will be acknowledged as not to scale.

DETAILED DESCRIPTION OF THE INVENTION

Figure 1:
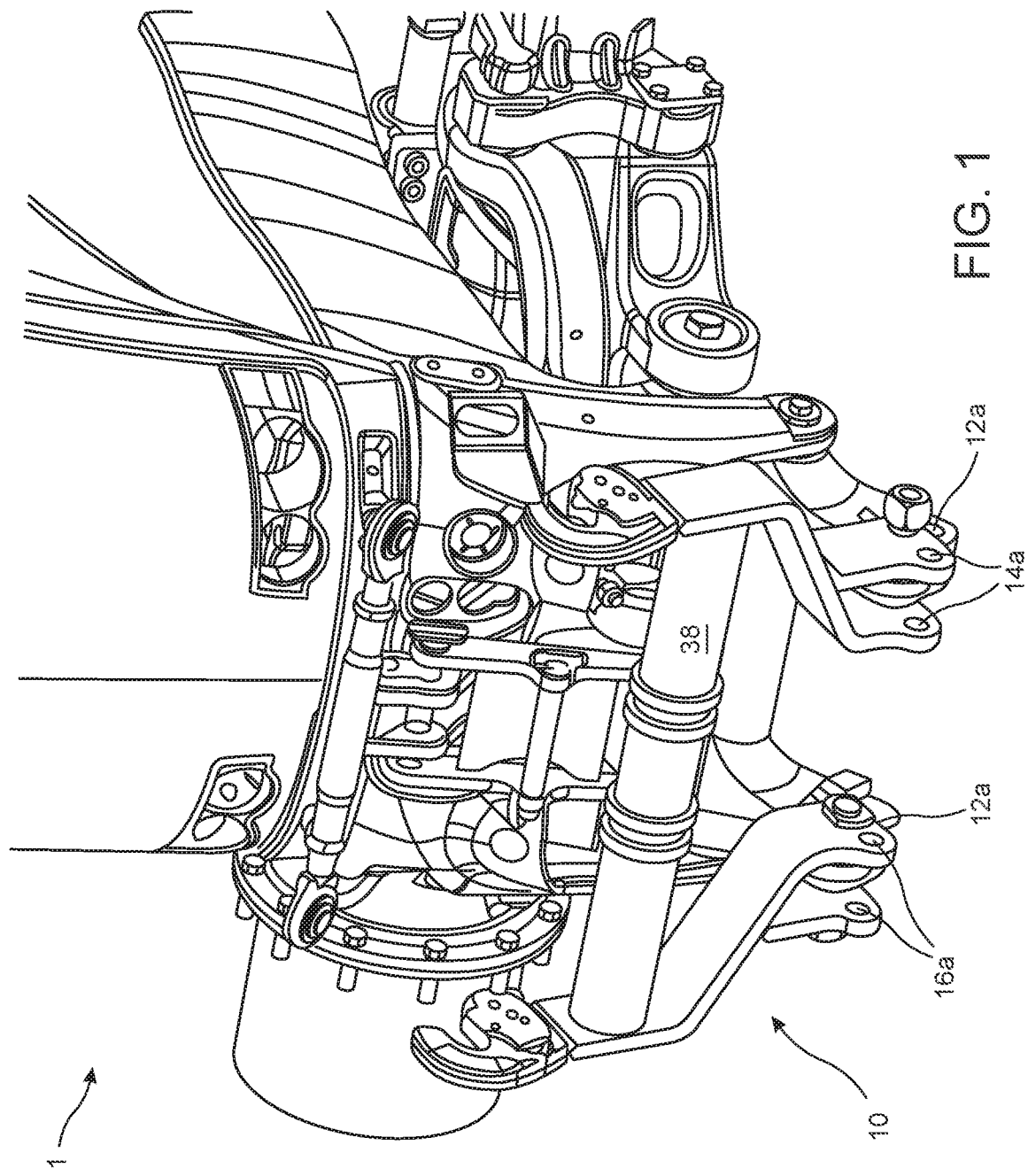
FIG. 1 is a view of the hitch assembly in a stowed arrangement and folded on the front of a vehicle.

With reference to FIG. 1, a hitch assembly 10 mounted to the front of a working vehicle 1 which in this example is a tractor.

With reference to FIGS. 1 to 4, the hitch assembly 10 comprises a carrier 12, a pair of lift arms 14, 16, a link member 18, a locking means 20, and a pair of actuators 22a, 22b.

Figure 3:
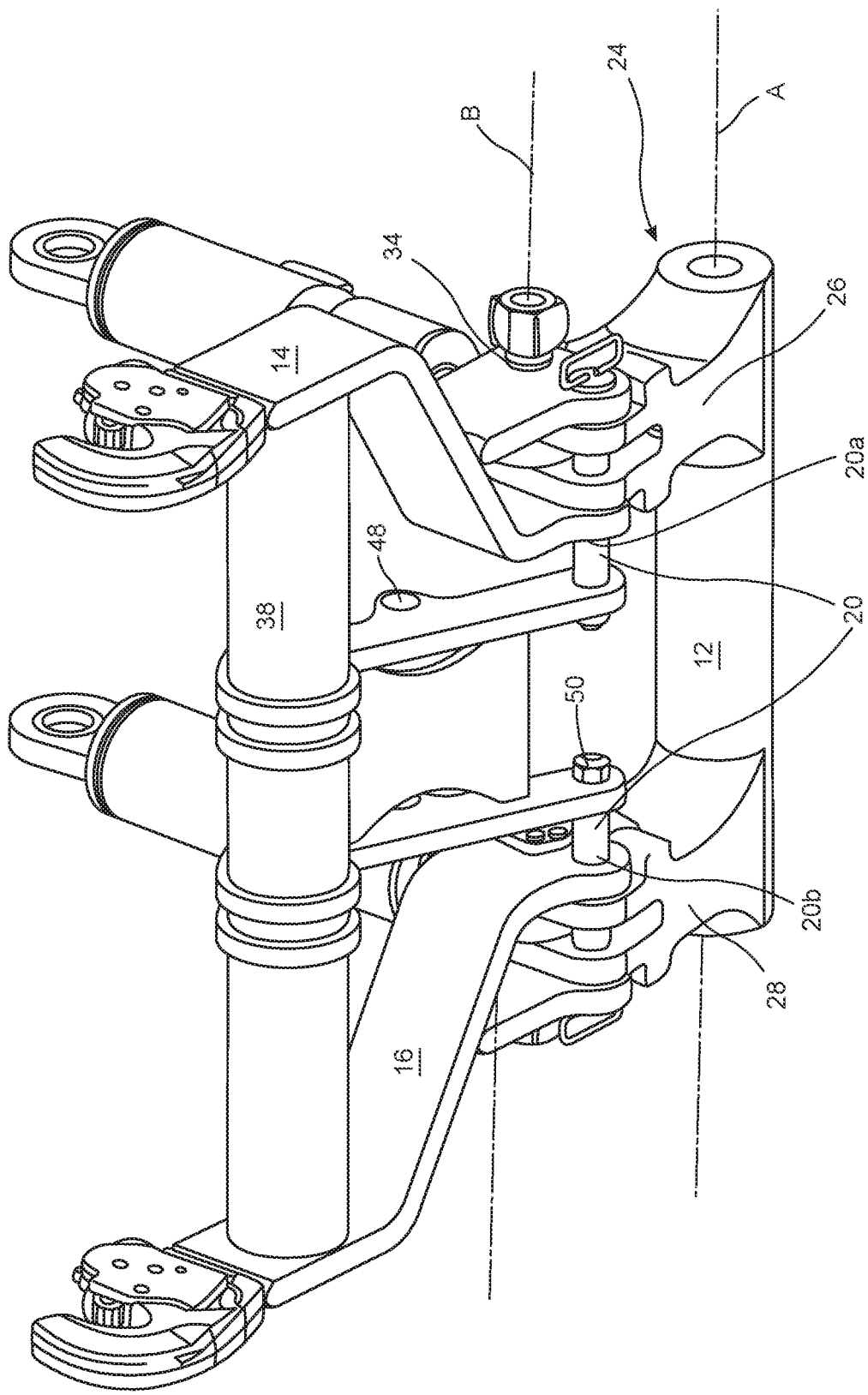
FIG. 3 is an alternative view of FIG. 2.
Figure 4:
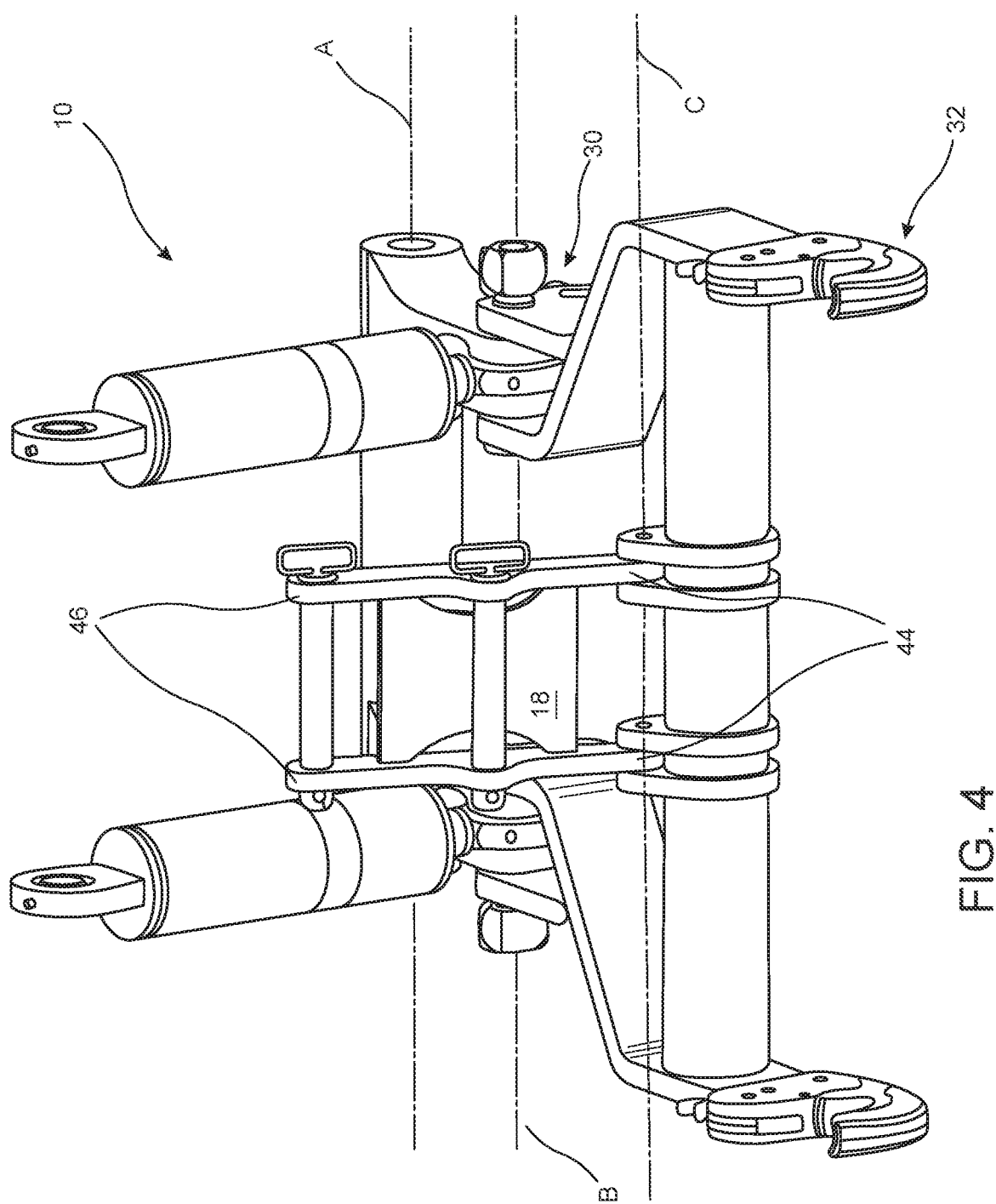
FIG. 4 is a view of the hitch assembly in the stowed arrangement ready to be folded by extension of the actuators.
Figure 5:
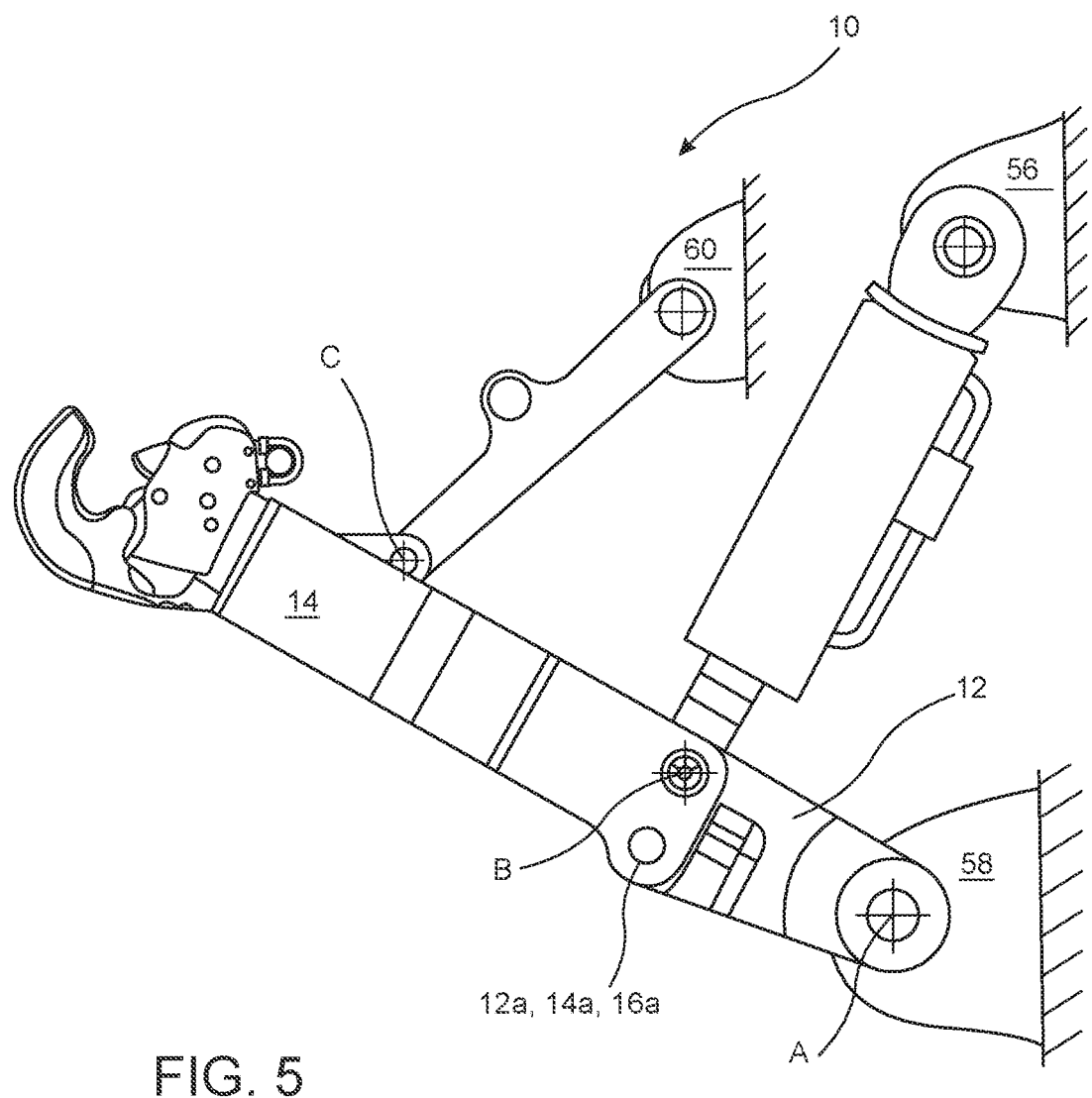
FIG. 5 is a side elevation of a hitch assembly in an unfolded position and prepared in the stowed arrangement.

The carrier 12, is best seen in FIG. 3. The carrier 12 has a generally cylindrical body 24, with two mounting points 26, 28 which project from the body 24. The body 24 is pivotable about an axis A. In this embodiment the axis A denoted where the carrier 12 is pivotable relative to a lower mount 58 which in this case is provided on the vehicle chassis. The carrier 12 further includes a locking hole 12a.

The pair of lift arms 14, 16, are substantially identical and each have a first end 30 and a second end 32. The first end 30 is forked and has a hinge hole 34 and a locking hole 34. Both the lift arms 14, 16 are pivotable about an axis B. The second end 32 of each lift arm 14, 16 terminate in a hook 36 suitable for the attachment of an implement such as a mower or harrow. In this embodiment the lift arms 14, 16 are joined by a transom 38 which is positioned toward the second end 32 of the lift arms 14, 16. The transom 38 serves to provide additional structural rigidity to the hitch assembly 10. In alternative embodiments it will be understood that the lift arms 14,16 may be shaped such that a transom is not required or even not joined at all. The transom 38 includes a pair of mounts 40. Each of the mounts 40 include a hole 42 which define an axis C. Each of the lift arms 14, 16 further includes a locking hole 14a and 14b respectively.

The link member 18, is generally elongate and comprises a first end 44, second end 46, storage hole 48 and an attachment hole 50. The attachment hole 50 is positioned proximate the second end 46 with the storage hole 48 being situated generally spaced from both the first end 44 and the second end 46 of the link member 18.

The locking means 20 is in this embodiment a pin having a loop at one end to allow an operator ease of handling of the pin during insertion and or removal from a hole. In alternative embodiments the locking means 20 may be in the form of a collar slideable over the hinge point of two pivotable connected members to prevent relative movement of the members relative to one another. This locking collar is a commonly known arrangement and will not be described in further detail.

The pair of actuators 22a, 22b each has a first end 52, and a second end 54. The actuators are double acting hydraulic rams, however in an alternative embodiment; they may be linear electric actuators or solenoids. The first end 52 of each actuator 22a, 22b is attached to the carrier 12 and the lift arms 14, 16 respectively at the second axis B. The second end 54 of each of the actuators 22a, 22b is attached to a mount 56 on the tractor. In this embodiment the mount 56 is part of the vehicle chassis however in alternative embodiments other suitable mounts on the body or vehicle frame maybe used.

Figure 2:
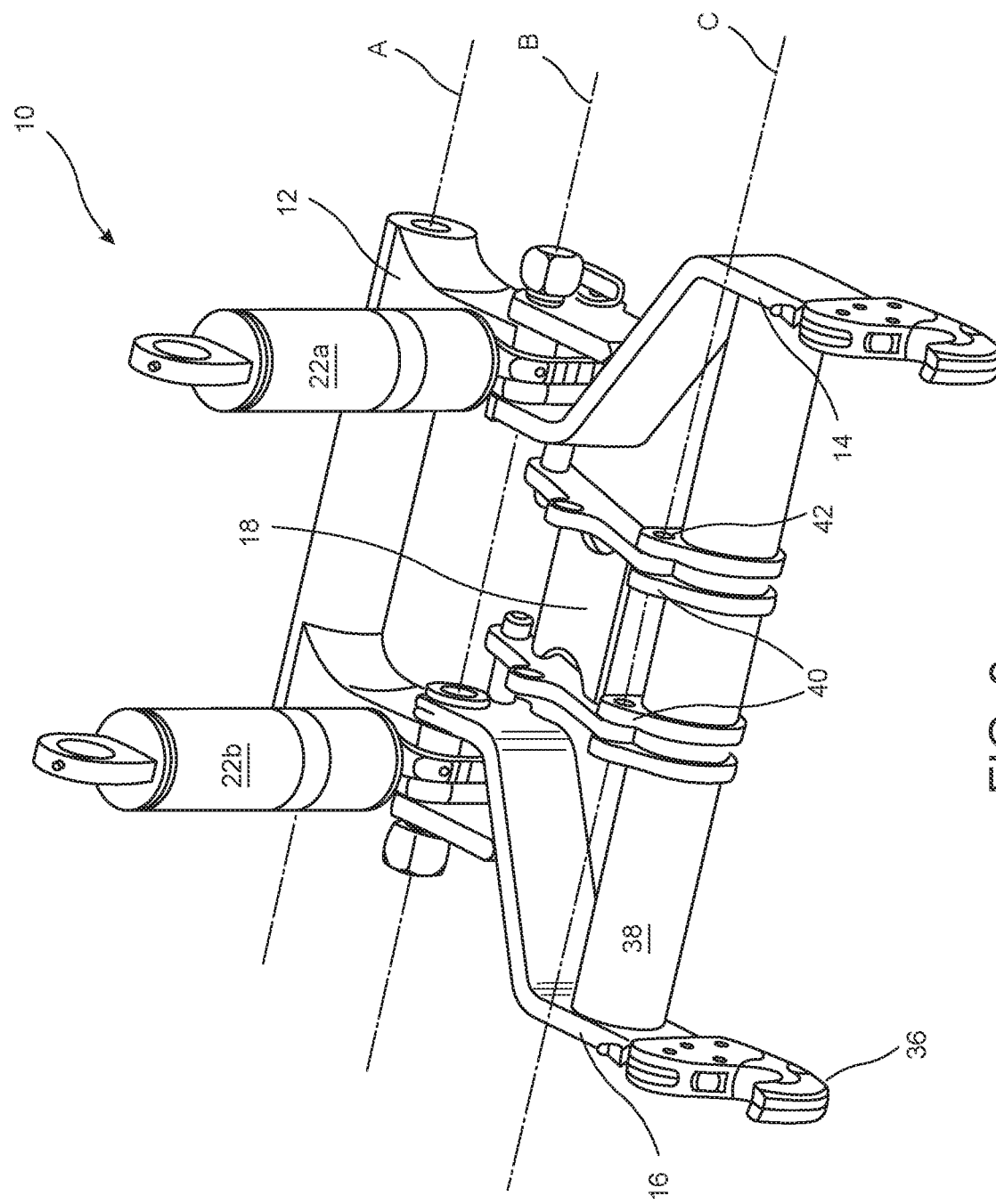
FIG. 2 is a view of the hitch assembly in isolation in the working arrangement.

In use, the hitch assembly has two different arrangements, a working arrangement and a stowed arrangement.
Working Arrangement The working arrangement (working configuration) is best seen in FIGS. 2 and 3. In the working arrangement the hitch assembly can be used to attach implements and can be raised and lowered in a conventional manner by extending or retracting the actuators 22a, 22b. Extending and retracing the actuators 22a, 22b pivots the lift arms 14, 16 and the carrier 12 about the axis A. To ensure that the lift arms 14, 16 and the carrier 12 are fixed relative each other, the locking means 20 is inserted through corresponding locking holes 12a and 14a and 12a and 16a. The insertion of the locking means into the locking holes prevents relative movement of the carrier 12 and the lift arms 14, 16. Furthermore, the locking means 20 protrudes through the locking holes 12a, 14a, 16a to engage the attachment hole 50 of the link member 18 thereby preventing rotation of the link member 18 about the axis C. This prevents unwanted rotation of the link member 18 about the axis C when the hitch assembly 10 is in use. It will be understood that relative movement of the lift arms 14, 16 and the carrier 12 can be achieved using only a single locking means 20 however in this embodiment two locking means 20 are used.
Stowed Arrangement When the hitch assembly 10 is desired to be moved from the working arrangement to the stowed arrangement (folded configuration), the lift arms 14, 16 and the carrier must be free to hinge or fold relative to each other about the axis B. This is facilitated by removing the removing each of the locking means 20 from the corresponding holes 12a, 14a, 16a. Once this has been done the link member 20 is free to rotate about the axis B.

Figure 6:
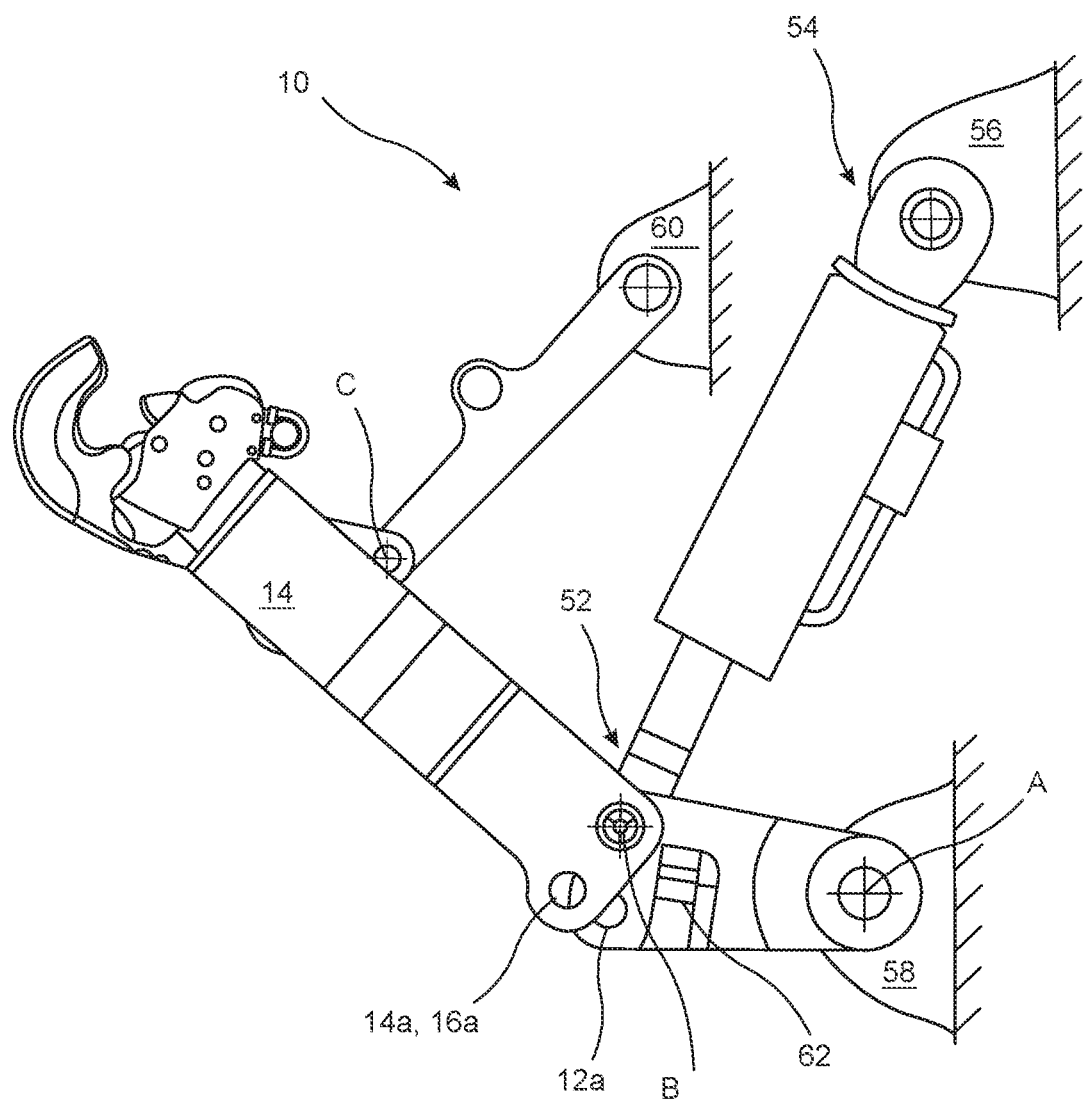
FIG. 6 is a side elevation of a hitch assembly in the stowed arrangement and partially folded.
Figure 7:
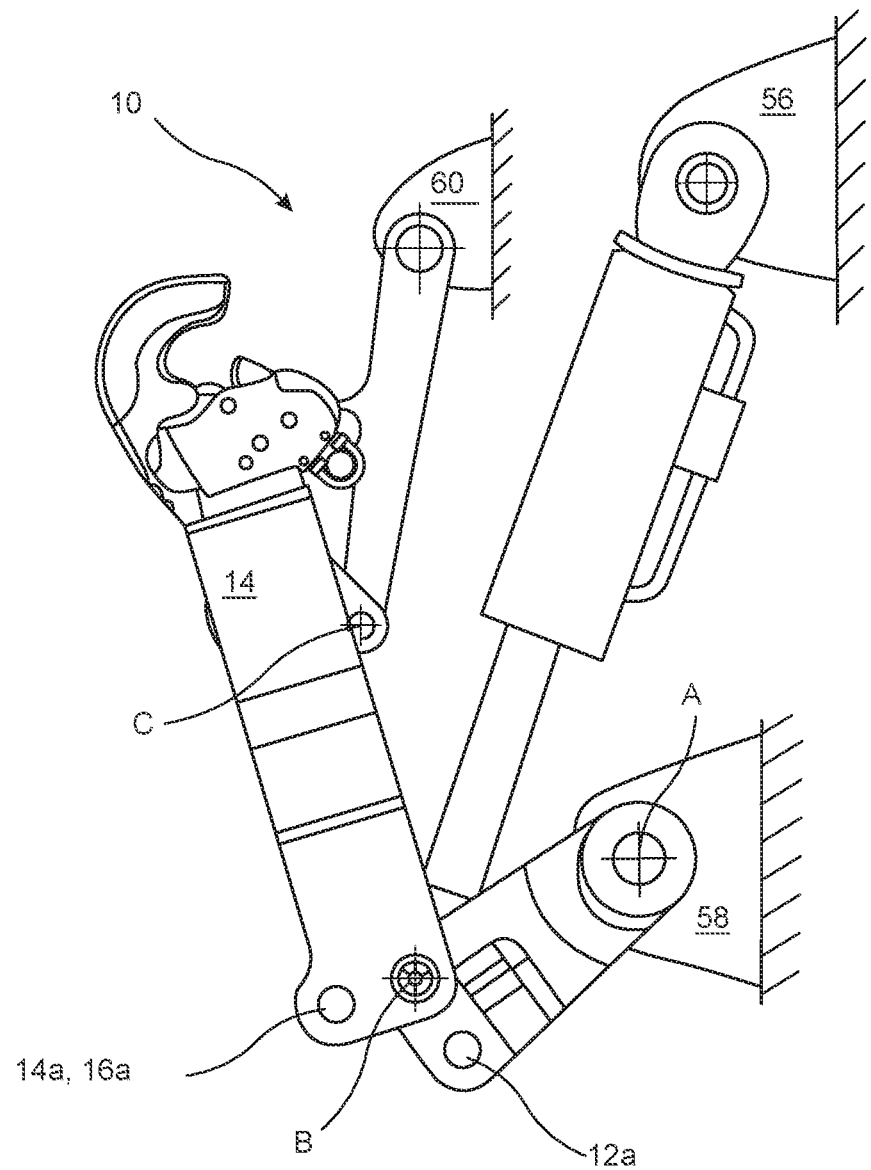
FIG. 7 is a side elevation of a hitch assembly in the fully folded stowed arrangement.

The link member 20 is next attached to a stowing mount 60 which in this embodiment is on the chassis of the tractor. The attachment hole 50 receives the locking means 20 which was previously used to fix the lift arms 14, 16 relative to the carrier 12, and secures the link member to the stowing mount 60. This arrangement is best seen in FIG. 6.

The second locking means 20 which is not used to attach the link member 20 to the stowing mount 60 can be conveniently stowed in the storage hole 48. An abutment 62 prevents the lift arms 14, 16 from dropping down when the locking means 20 is removed by engaging with the first end 30 of the lift arms 14, 16 and acting as a rotation stop.

The vehicle operator can now extend the actuators 22a and 22b. The extension of the actuators 22a, 22b caused the lift arms 14, 16 to fold relative to the carrier 12 about the axis B. This motion means that the second end 36 of the lift arms 22a, 22b is brought towards the mount 56 as the axis B is moved away from the mount 56 by extension of the actuators 22a, 22b, thereby conveniently stowing the hitch assembly 10 into a more compact package than when in the working arrangement.

By utilising the double pivot arrangement to move the hitch assembly 10 to the stowed position, the actuators 22a, 22b can be used to reposition the hitch assembly and thus no heavy lifting is required by a vehicle operator.

To return the hitch assembly 10 to the working arrangement, the above-mentioned process is reversed.

The invention is not limited to the embodiments or examples described herein, and may be modified or adapted without departing from the scope of the present invention.

The invention claimed is:

1. A hitch assembly for a working vehicle, the front hitch assembly comprising:
   a carrier for attachment to a working vehicle, the carrier being pivotable about a first axis;
   a pair of lift arms each of the lift arms having a first end and a second end, the lift arms pivotably attached to the carrier about a second axis, the second axis being proximate the first ends of the lift arms;
   a link member having a first end and a second end, the first end of the link member being pivotably attached to the pair of lift arms about a third axis, the third axis being positioned closer to the second end of the lift arms than the second axis, the second end of the link for attachment to a working vehicle;
   a locking means;
   an actuator pivotably connected to the carrier and the lift arms at the second axis;

wherein the hitch assembly has a working configuration and a folded configuration; and wherein in the working configuration, the locking means secures the lift arms relative to the carrier such that relative movement about the second axis is prevented and the actuator is operable to raise and lower the lift arms; and wherein in the folded configuration, the lift arms are pivotable relative to the carrier about the second axis, and the second end of the link member is secured to a vehicle mount, such that extension of the actuator folds the lift arms relative to the carrier about the second axis, thereby moving the hitch assembly from the working configuration to the folded configuration.

2. A hitch assembly according to claim 1 wherein the locking means is a locking pin, the locking pin insertable into corresponding holes in the lift arms and carrier such that lift arms are fixed relative to the carrier.

3. A hitch assembly according to claim 1 wherein the actuator is a hydraulic ram.

4. A hitch assembly according to claim 1 wherein the locking means secures the second end of link member relative to the lift arms when the hitch is in the working configuration.

5. A hitch assembly according to claim 1 wherein the locking means is used to secure the link member to a vehicle mount.

6. A hitch assembly according to claim 1 wherein the locking means is a lock collar, the lock collar slideable over the first end of the lift arms and the carrier such that the lift arms are fixed relative to the carrier.

\* \* \* \* \*